United States Patent [19]

Dunn

[11] 4,005,636

[45] Feb. 1, 1977

[54] HYDRAULIC SYSTEM FOR A WORKING MACHINE

[75] Inventor: Donnell L. Dunn, Terre Haute, Ind.

[73] Assignee: J. I. Case Company, Racine, Wis.

[22] Filed: Feb. 13, 1975

[21] Appl. No.: 549,835

[52] U.S. Cl. .................................... 91/31; 91/6;
 91/412; 91/413; 91/448; 137/101; 137/599
[51] Int. Cl.² .................................... F15B 13/04
[58] Field of Search ............... 91/411 R, 413, 448,
 91/412, 6, 31; 137/599, 101

[56] References Cited

UNITED STATES PATENTS

| | | | |
|---|---|---|---|
| 3,047,171 | 7/1962 | Long | 214/132 X |
| 3,216,444 | 11/1965 | Herner | 137/599 X |
| 3,385,311 | 5/1968 | Allen | 137/101 |
| 3,454,046 | 7/1969 | Lanctot | 137/599 |
| 3,568,868 | 3/1971 | Chichester | 91/412 X |
| 3,575,254 | 4/1971 | Sipos | 91/411 X |
| 3,642,019 | 2/1972 | Kramer et al. | 137/101 |
| 3,703,186 | 11/1972 | Brewer | 91/412 X |
| 3,771,424 | 11/1973 | Allen | 91/448 X |
| 3,782,249 | 1/1974 | Drone | 91/411 R |
| 3,834,278 | 9/1974 | Goff | 91/413 |
| 3,854,380 | 12/1974 | Casey | 91/413 |

Primary Examiner—Martin P. Schwadron
Assistant Examiner—Abraham Hershkovitz
Attorney, Agent, or Firm—Arthur J. Hansmann

[57] ABSTRACT

A hydraulic system for a working machine of the vehicle type having a power steering mechanism and a hydraulically powered working implement, such as a back-hoe implement. A hydraulic valve is inclined in the power steering mechanism, and another hydraulic valve operates the powered implement. A flow control valve divides flow between the aforementioned two valves, and a pump supplies the flow in the system. Pressure relief valves are included in the system, such that one relief valve senses pressure in the power steering branch of the system, and that relief valve responds to the lowest hydraulic pressure, and a relief valve for the powered implement responds to a higher hydraulic pressure. Only a single hydraulic pump is required for the power steering and the powered implement.

1 Claim, 2 Drawing Figures

HYDRAULIC SYSTEM FOR A WORKING MACHINE

This invention relates to a hydraulic system for a working machine of a vehicle type and one which includes a power steering mechanism and a powered implement, such as a back-hoe implement.

BACKGROUND OF THE INVENTION

The prior art is already aware of hydraulic systems in powered and working vehicles, such as tractors with power steering and powered back-hoe implements. In these prior systems, it is common to have one hydraulic system, including a hydraulic pump, for operating the powered steering mechanism and to have another hydraulic system, including another hydraulic pump, for operating the powered implement, such as the back-hoe mounted on the vehicle. An example of the latter mentioned arrangement of a hydraulic system for a powered implement is shown in U.S. Pat. No. 3,047,171, and that disclosure is incorporated in this description.

Therefore, in the prior art, two hydraulic pumps are required, each one providing the hydraulic pressure for the respective hydraulic system mentioned, such as the power steering system and the working implement system.

The present invention improves upon the prior art systems in that it provides an integrated hydraulic system wherein the vehicle power steering mechanism and the working implement mechanism, and their respective hydraulic controls, are integrated into one system. In accomplishing this objective, the system of this invention requires only one hydraulic pump for powering both the power steering and the working implement.

Another object and advantage of the present invention is to provide a hydraulic system wherein there is an improved steering response in the powered steering mechanism at low vehicle engine speeds, and there is also conservation of power and energy through eliminating the power steering hydraulic pump and also eliminating its usual attached and associated elements which result in energy losses, compared to the system described herein.

In accomplishing the aforementioned objectives, the hydraulic system of the present invention utilizes an open-center steering valve with power beyond capability and an open-center loader-backhoe valve wherein the hydraulic elements are integrated into one system for the dual functions referred to herein. In this arrangement, the hydraulic pressure in the power steering portion of the system can be limited to a lower pressure than that in the loader-backhoe portion of the system, and thus the respective portions receive their required pressures but not excessive pressures. Further, this system recognizes that it is common practice that when the power steering portion of the system is being used the loader-backhoe portion of the system does not necessarily require a high pressure; and, conversely, when the loader-backhoe portion of the system is being used, the power steering portion of the system need not operate and there can be complete relief of pressure in that portion of the system at that time.

Other objects and advantages will become apparent upon reading the following description in light of the accompanying drawings.

DETAILED DESCRIPTION OF THE PREFERRED EMBODIMENT

Figures 1, 2:
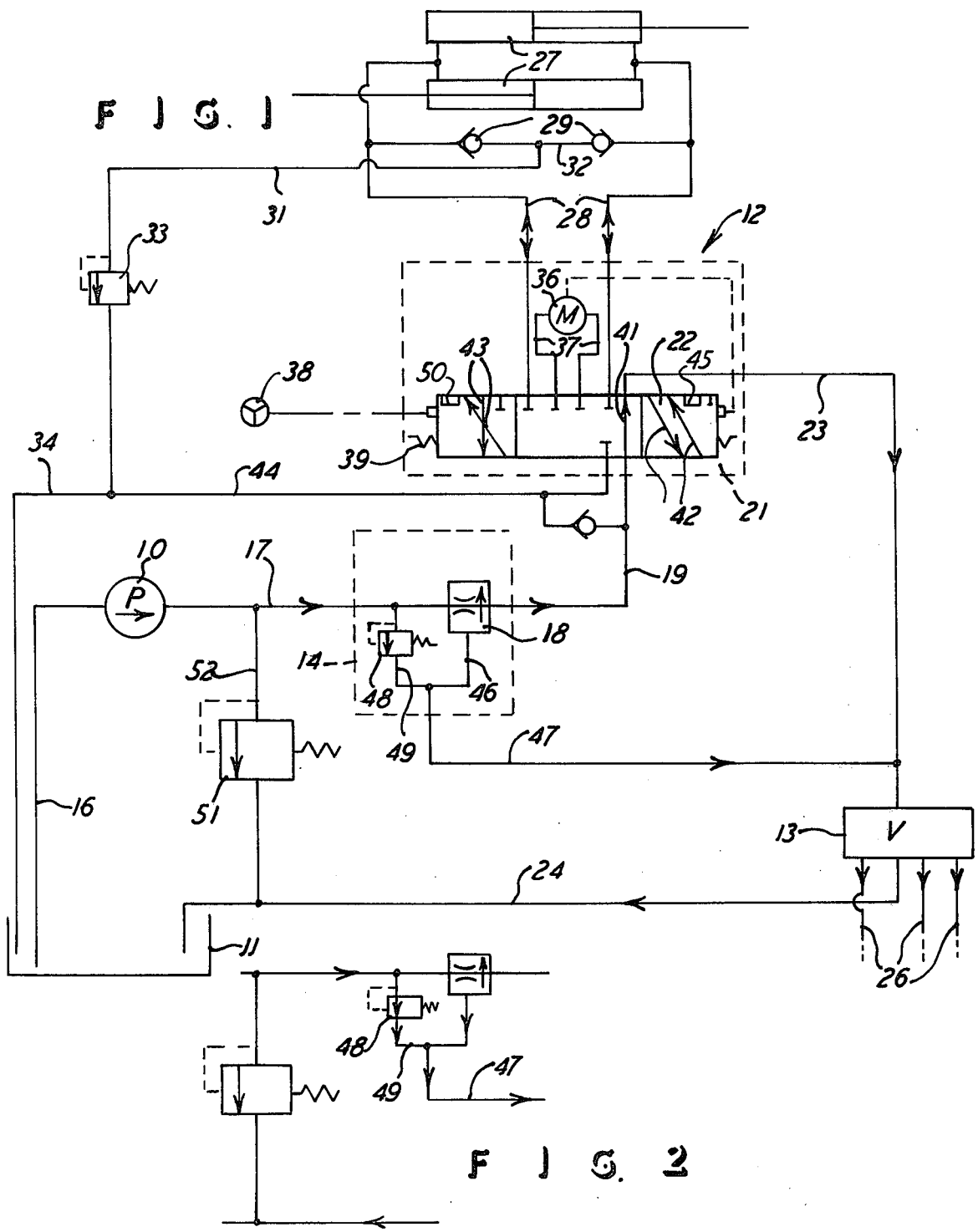
FIG. 1 is a diagrammatic view of the hydraulic system of this invention.
FIG. 2 is a diagrammatic view of a fragment of the system shown in FIG. 1, and showing one relief valve in a different position.

The drawings diagrammatically show the hydraulic system, and it will be understood that at least a portion of the system would be useful in an embodiment such as that shown in U.S. Pat. No. 3,047,171, and, to the extent that the present disclosure does not literally show elements referred to herein and also elements shown in said patent, said patent is incorporated in this disclosure. Still further, one skilled in the art will fully understand the present invention as it pertains to a hydraulic system embodied in a tractor having a power steering mechanism for controlling the steering of the tractor front wheels and having a loader-backhoe implement, such as that shown in said patent, which is articularly mounted on the tractor for the several pivotal actions common in that type of implement.

Further, the diagrammatic showing is all that is required to enable one skilled in the art of hydraulic systems to understand the present invention and to provide the basis for the claims appended hereto. Accordingly, the system includes a hydraulic pump 10, a hydraulic reservoir 11 having a necessary supply of hydraulic fluid, and it includes a power steering mechanism, generally designated 12, and a valve 13 which controls a working implement which is not shown but which may be of the nature disclosed in said patent or may be of any well-known arrangement under the influence of hydraulic elements, such as the well-known backhoe and loader buckets and the like. Further, the system includes a flow control and a steering relief valve arrangement shown within the dotted rectangle which is designated 14. Still further, the entire system includes the necessary hydraulic hoses and connections and hydraulic lines generally required to make the system complete and operative, and those hydraulic lines are shown in single lines on the drawing, such as the line 16 which is hydraulically connected between the reservoir 11 and the pump 10, in the well-known manner or any conventional manner, and the line 16 of course conducts hydraulic fluid to the pump 10, in the usual manner. Further, a hydraulic line 17 is suitably hydraulically connected between the pump 10 and the arrangement at 14, for conducting the hydraulic fluid to a flow control valve 18 from which the hydraulic fluid continues in a line 19 and flows to an arrangement designated 21 which incorporates the power steering spool-type valve 22 and which has a hydraulic line 23 extending from the valve 22 and to the implement valve 13, as shown. A hydraulic line 24 is connected between the valve 13 and the reservoir 11 for the flow of fluid to the reservoir 11. Further, as shown on the drawing, the arrowheads indicate the direction and the flow of fluid through the various hydraulic lines shown and referred to herein.

It will be further readily understood by one skilled in the art that hydraulic lines, such as the lines 26, are connected with the valve 13 and extend to the usual cylinders, motors, or the like for operating the powered implement which is not shown but which of course can be the loader-backhoe bucket, for instance.

Accordingly, hydraulic fluid is supplied to the power steering mechanism through the line 19, and, depending upon the positioning of the hydraulic steering valve 22, the hydraulic fluid is directed to the conventional hydraulic steering cylinders 27 through the hydraulic line 28, as indicated. Thus, the cylinders 27 respond to the hydraulic pressure entering the shown two-way acting cylinders 27 for the steering of the tractor, in the usual and conventional manner. Again, the arrowheads on the hydraulic hose lines 28 show that flow may be in either direction in each line 28 for the usual complete steering control of the tractor. Also, the drawing conventionally shows check valves 29 cross-connected between the line 28 to permit the flow to go to a line 31 which is connected with the line 32 in which the check valves 29 are located. Thus the excessive hydraulic flow to the cylinders 27 can be diverted to the line 32 through the check valves 29 and then to the line 31 and to the pressure relief valve 33 in the line 31. If the pressure in the power steering mechanism 12 is then greater than a set pressure of say 2,000 psi at the valve 33, then the valve 33 will open and permit the pressure to be relieved in the hydraulic system and flow will go to the line 34 which is connected with the reservoir 11, all in a manner which will be understood, by one skilled in the art, from viewing the drawing herein. Further, a hydraulic motor 36 is shown to be included in the system and is connected with the valve 22 through the lines 37 so that the motor 36 can assist in the operation of the power steering unit by metering oil to steering cylinders 27, while a steering wheel 38, of a conventional type is turned by the operator. Further, return springs 39 are at each end of the spool 22 for self-centering of the spool which is of an open-center nature so that, in the position shown in FIG. 1, the hydraulic fluid can flow from the line 19 and directly to the line 23, without pressure drop, and flow goes through the spool passageway 41 which depicts the open-center nature of the spool 22 which is therefore passing the flow directly to the valve 13 rather than utilizing the flow for powering the tractor front wheels.

It will also be seen and understood, by one skilled in the art, that the spool 22 has passageways 42 which respectively flow-communicate with the power steering valve outlets connected to the lines 28. Thus, if the spool 22 is shifted to the left, as viewed in FIG. 1, there would be a pressurized flow of fluid in the right-hand line 28, as viewed in FIG. 1, as the flow would then go from the line 19 and through the right-hand passageway 42 and through the left-hand line 37 and up to the motor 36 and through the motor 36 and down the right-hand line 37 and through spool passage 45 and to the right-hand line 28. Conversely, if spool 22 were shifted to the right, then the spool passageways 43 would align such that oil would flow through right-hand line 37, through motor 36, through left-hand line 37, back through spool passage 50, and to the left-hand line 28 and then the flow in the lines 28 would be in the direction for steering the tractor opposite from the condition just previously described. In this arrangement, the return passageway of each pair of passageways 42 and 43 will flow-communicate with the line 44 for returning the fluid to the tank 11 through the line 34, for instance. In this arrangement, the power steering mechanism 12 utilizes the open-center power steering valve 22, and that valve is in hydraulic flow connection and communication with the single pump 10 for the entire system which therefore also is supplying this power steering portion of the system, as described.

The flow control valve 18 is therefore passing perhaps 8 to 10 gallons per minute of hydraulic fluid to the power steering mechanism 12, but the pump 10 may be putting out 17 to 20 gallons per minute, and the extra quantity of flow is then going through the control valve 18 and to the line 46 and the line 47 and to the line 23 and then into the valve 13, for the purpose mentioned. With that arrangement, only the single pump 10 is required for supplying the flow to the two valves 13 and 22.

A pressure relief valve 48 is hydraulically connected with the line 17 such that if hydraulic pressure rises to a minimum in the power steering portion 12, then the valve 48 will respond to that increased hydraulic pressure and will open and permit the pressure to be relieved through the line 49 which also connects with the line 47, rather than pass the flow and energy of the hydraulic pressure to the line 19. That is, the pressure relief valve 48 may be a low-pressure type valve, say such as 1,700 psi, and thus the hydraulic steering portion 12 is amply supplied with hydraulic pressure but is protected against a surplus of pressure by the valve 48, as described. Of course when the valve 48 is in the open position mentioned, then flow can go through the lines 46 and 49 and to the line 47 for supplying the valve 13 with hydraulic fluid, and, at the same time, the power steering mechanism 12 is still receiving hydraulic fluid to at least the minimum pressure of the suggested 1,700 psi.

Another pressure relief valve 51 is shown connected with a line 52 which connects between the lines 17 and 24, as shown diagrammatically. That is, the valve 13 and its attached hydraulic lines 26 are subject to the action of the pressure relief valve 51, such that, when a minimum pressure is present in the valve 51, say a pressure of 2,800 psi, then the valve 51 will open and permit the discharge from the pump 10 to go through the line 52 and to the line 24 and back to the reservoir 11, though the line 17 will still of course retain the 2,800 psi which is still being supplied to the two portions described herein, namely, the power steering portion 12 and the working implement portion defined by the valve 13 and its line 26. In this arrangement, it will now be understood that the valve 48 responds to a lower hydraulic pressure than does the valve 51, and thus the power steering mechanism 12 is protected by the valve 48, and the working implement portion of the system requiring the higher pressure still receives the higher pressure, all as desired.

FIG. 2 therefore shows the position of the valve 48 when the power steering mechanism 12 is up to its minimum hydraulic pressure, and it will be seen that the valve 48 has opened to pass the fluid to the line 49 and to the line 47 and thus limit the hydraulic pressure in the portion 12. Further, the diagrammatic arrangement shown indicates that the valve 13 is a distributing valve for the various functions of the working implement, and it is also shown to be an open-center type valve which in the centered position will pass the hydraulic flow through the valve from the line 23 and to the return line 24, all as is well known by one skilled in the art.

The entire arrangement is such that there need not be a separate hydraulic pump for supplying hydraulic fluid to the power steering portion 12, and, since the pump 10 is not the usual power steering hydraulic pump, it is not necessarily dependent upon engine speed and therefore the pump 10 can be operated at full capacity at all times. Also, the flow divider valve 18 is of a conventional arrangement and always supplies the power steering portion 12, as required, and the remainder of the flow, at a higher pressure according to the relief valves 48 and 51, is supplied to the valve 13 which normally can utilize and does require a higher hydraulic pressure.

Accordingly, during the power steering action of the tractor, sufficient hydraulic pressure is available in the line 19 and to the valve 22 and its attached hydraulic parts, as shown, for the power steering action required. When the power steering cylinders 27 reach their overload condition, then the hydraulic pressure will rise to the value sufficient to open the relief valve 48, in the manner and for the purpose described herein. Additionally, during backhoe or loader operation through the valve 13, the machine is commonly supported on stabilizer arms and the power steering mechanism 22 is not needed. At that time, the entire output of the pump 10 is directed to the valve 13 through the lines 19 and 47 and through the open-center portion 41 of the valve 22, as described. Within this entire system, the power steering mechanism 12 is limited to a lower hydraulic pressure, by virtue of the lower pressure valve 48 compared to the relief valve 51. Therefore, the flow control valve 18 is hydraulically connected with the valves 22 and 13, and the valve 22 is in the nature of a hydraulically parallel type connection with respect to the valves 18 and 13. Accordingly, fluid is by-passed relative to the power steering lines 28. Also, in the arrangement of the relief valves shown and described, the valve 33 is available for relief of an excessive pressure in the power steering mechanism 12, and that pressure may be slightly higher than the relief pressure value in the valve 48, for example, it may be 2,000 psi, for emergency protection, and if desired.

What is claimed is:

1. A hydraulic system for a working machine of a vehicle type having a hydraulically powered power steering mechanism and a hydraulically powered working implement, a hydraulic valve included in said steering mechanism, an additional hydraulic valve for operating said implement, the improvement comprising a flow control valve hydraulically connected with each of the other two said valves and being of the type and connected therewith for dividing hydraulic flow between said other two valves and to be free of any hydraulic pressure altering means and to be thus arranged to always have the same hydraulic pressure flow to said two valves, a hydraulic pump hydraulically connected with said flow control valve for pumping hydraulic fluid to all said valves, a hydraulic line connected directly between said other two valves to have said other two valves directly hydraulically connected together, said flow control valve being hydraulically connected with said other two valves to have said vehicle steering valve in a hydraulically parallel type of connection relative to the hydraulic connection between said flow control valve and said additional hydraulic valve, said other two valves being of the open-center type for the flow of fluid through said other two valves without utilizing the flow therethrough for any useful work, said steering mechanism hydraulic valve being hydraulically connected with said implement hydraulic valve to be upstream from said implement hydraulic valve relative to the hydraulic output of said pump, whereby all the flow through said flow control valve may be passed through said implement hydraulic valve, a fluid pressure relief valve hydraulically connected with said other two valves and being disposed upstream from said flow control valve for diverting the pump flow from said pump away from said steering mechanism hydraulic valve and to said implement hydraulic valve when hydraulic pressure at said steering mechanism hydraulic valve is at a minimum pressure, and an additional fluid pressure relief valve hydraulically connected with said pump and connected to by-pass said implement hydraulic valve for diverting flow from said pump away from said implement hydraulic valve when hydraulic pressure at said implement hydraulic valve is at a minimum pressure, and with said additional fluid pressure relief valve being arranged and of a type to divert the flow only at a hydraulic pressure greater than that at which the first said fluid pressure relief valve diverts the flow.

* * * * *